United States Patent [19]

Ikegami et al.

[11] Patent Number: 4,565,936
[45] Date of Patent: Jan. 21, 1986

[54] ROTOR FOR ROTARY MACHINE

[75] Inventors: Takashi Ikegami; Masakazu Mori, both of Hyogo, Japan

[73] Assignee: Mitsubishi Denki Kabushiki Kaisha, Tokyo, Japan

[21] Appl. No.: 647,586

[22] Filed: Sep. 5, 1984

[30] Foreign Application Priority Data

Sep. 5, 1983 [JP] Japan .................. 58-138993[U]

[51] Int. Cl.$^4$ .................................................. H02K 9/06
[52] U.S. Cl. .................................. 310/62; 310/63; 310/71; 310/91; 310/263
[58] Field of Search ............... 310/62, 63, 232, 263, 310/71, 42, 91, 68 D

[56] References Cited

U.S. PATENT DOCUMENTS

| | | | |
|---|---|---|---|
| 3,184,625 | 5/1965 | Farison | 310/59 |
| 3,230,404 | 1/1966 | Graham | 310/263 |
| 3,422,339 | 1/1969 | Baker | 310/68 R UX |
| 4,162,419 | 7/1979 | De Angelis | 310/62 |
| 4,464,594 | 8/1984 | Matsumoto | 310/63 |
| 4,488,070 | 12/1984 | Iwaki | 310/62 |

FOREIGN PATENT DOCUMENTS

| | | |
|---|---|---|
| 0030725 | 6/1981 | European Pat. Off. . |
| 302563 | 2/1972 | Fed. Rep. of Germany . |
| 2068542A | 7/1980 | United Kingdom . |

OTHER PUBLICATIONS

Delco-Remy Bulletin; 8/1/67; Anderson, Ind.

Primary Examiner—R. Skudy
Attorney, Agent, or Firm—Sughrue, Mion, Zinn, Macpeak & Seas

[57] ABSTRACT

A rotor for rotary machines of a type having a fan on a side surface of a magnetic field core in which there are provided recessed portions for holding lead wires at portions of the fan so that the fan can be fixed to the rotary shaft of the machine after making the connection between the lead wire of the magnetic field core and a slip ring.

2 Claims, 4 Drawing Figures

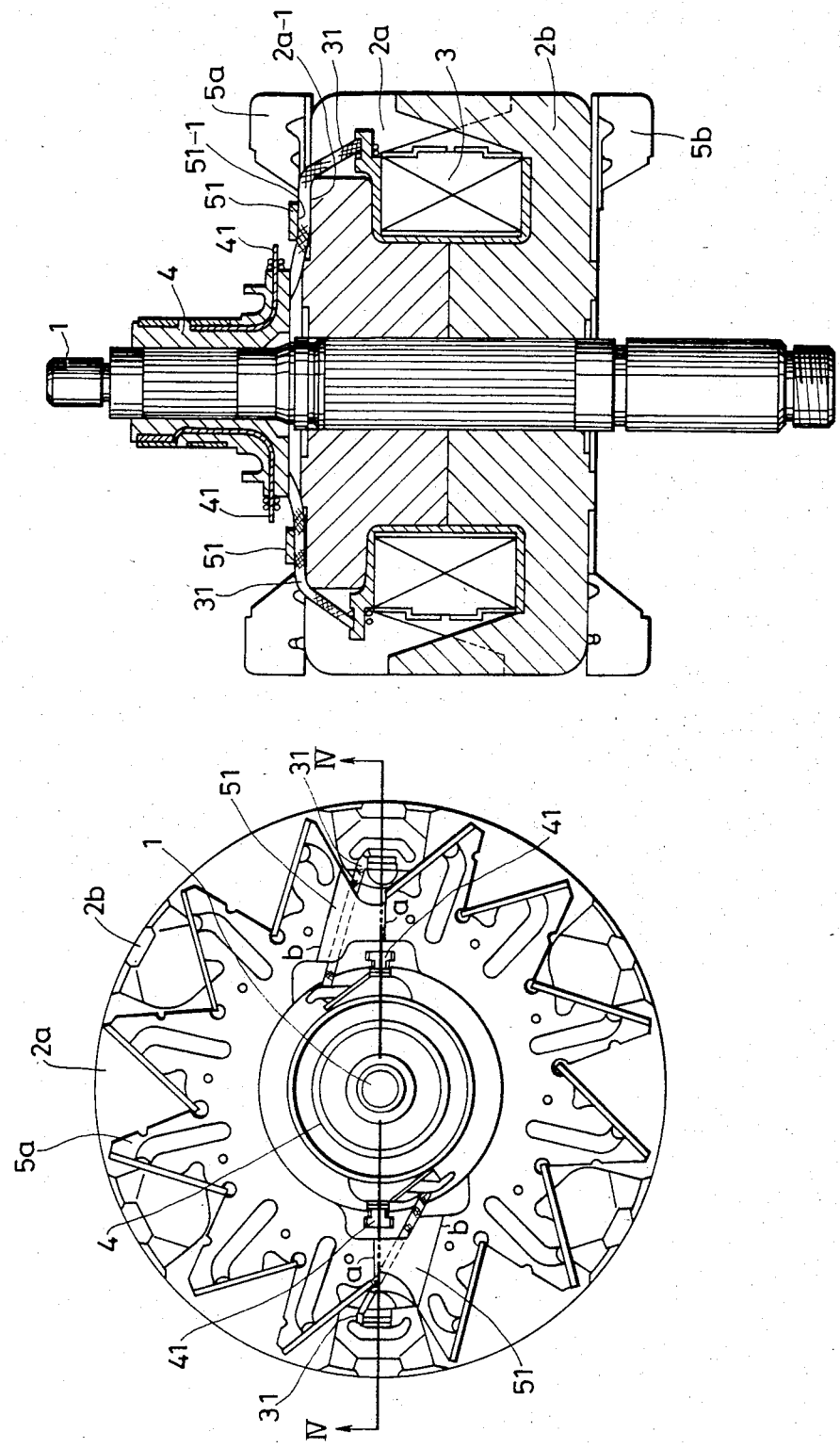

ROTOR FOR ROTARY MACHINE

BACKGROUND OF THE INVENTION

The present invention relates generally to a rotor used for a vehicular charging generator, particularly, to a changing generator having an improved connection between a magnetic field coil and a slip ring.

Referring to FIGS. 1 and 2, a conventional rotor used for a charging generator is shown. In FIGS. 1 and 2, reference numeral 1 denotes a rotary shaft of the charging generator; 2a and 2b, a pair of magnetic field cores fixed to the shaft 1 and which have an annular recessed portion opened to the periphery of the magnetic field core and magnetic pole portions arranged with alternating polarities; 3, a magnetic field coil which extends into the recessed portion of the magnetic cores; 31, lead wires connected to the magnetic field coil at one side surface of the magnetic field core 2a; 4, slip rings mounted on the shaft 1 of the magnetic field core 2a for supplying electric current to the field coil 3; 41, connecting terminals, the ends of which extend radially of the magnetic field core 2a for making connections to the lead wires 31; and 5a and 5b, cooling fans fixed to the side surfaces of the magnetic field cores 2a and 2b, for instance, by welding.

In the fabrication of this conventional rotor, the lead wires 31 of the magnetic field coil 3 are connected to the terminals 41 of the slip rings 4 after the fans 5a and 5b have been welded to the magnetic field cores 2a and 2b. Therefore, the operation of wiring the lead wires 31 to the connecting terminals 41 is hindered by the presence of the fan 5a, and it is not possible to effect the wiring operation by an automatic machine.

Further, the conventional rotor has the disadvantage that, if there is any slack in the lead wire 31, the lead wire 31 is apt undesirably to contact the magnetic field core 2a or the fan 5a due to the centrifugal force produce during rotation, leading to damage to the insulating layer of the lead wire 31 and possibly to severing of the lead wire 31.

SUMMARY OF THE INVENTION

Accordingly, an object of the present invention is to provide a rotor for rotary machines which can be more easily assembled.

A further object of the present invention is to provide a rotor for rotary machines capable of eliminating slack in lead wires thereof, thereby preventing the insulating layer of the lead wire from being damaged or the lead wire severed.

The above and other objects are achieved by a rotor for rotary machines comprising a rotary shaft, magnetic field cores fixed to the rotary shaft and having an annular recessed portion, a magnetic field coil received within the annular recessed portion, slip rings mounted on the rotary shaft at one side of the magnetic field cores for supplying electric current to the field coil, lead wires introduced to the outside of the magnetic field core from the magnetic field coil and connected to connecting terminals of the slip rings, and a fan fixed on one side of the magnetic field cores and having a holding portion for holding the introduced lead wires.

BRIEF DESCRIPTION OF THE DRAWINGS

FIG. 3 is an elevational view showing a preferred embodiment of a rotor of the present invention; and FIG. 4 is a cross-sectional view taken along a line IV—IV in FIG. 3.

DESCRIPTION OF THE PREFERRED EMBODIMENTS

Figure 2:
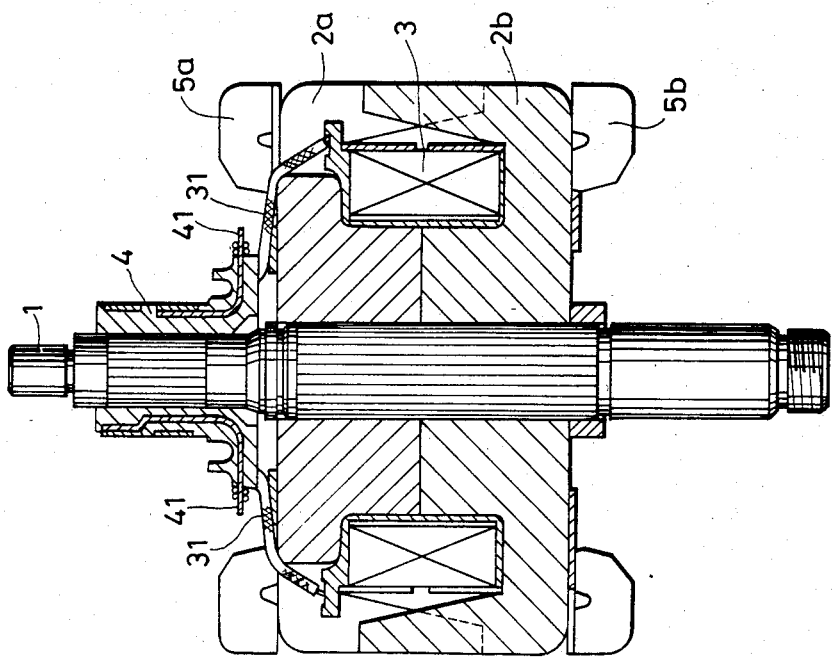
FIG. 2 is a cross-sectional view taken along a line II—II in FIG. 1.
Figure 1:
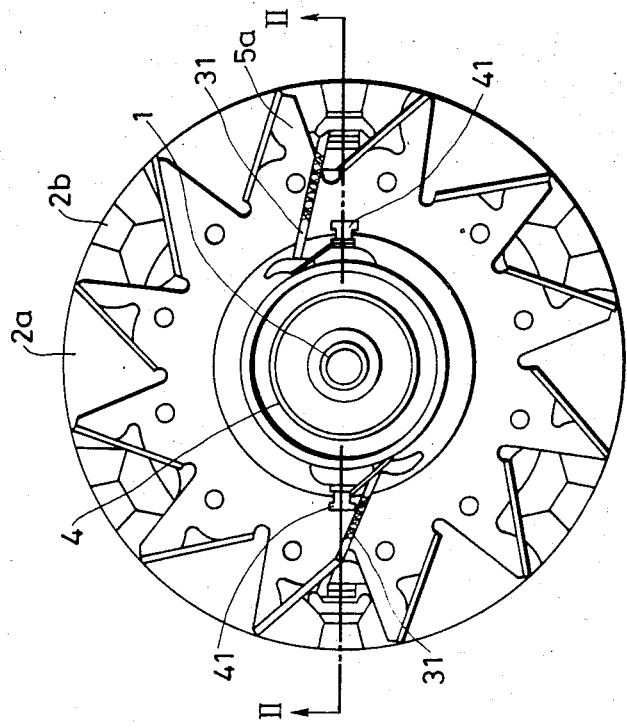
FIG. 1 is an elevational view showing a conventional rotor.

Referring to FIGS. 3 and 4, a preferred embodiment of a rotor of the present invention will be explained hereinafter.

In FIGS. 3 and 4, reference numeral 1 denotes a rotary shaft of a charging generator; 2a and 2b, a pair of magnetic field cores fixed to the rotational shaft 1 having an annular recessed portion opened to the periphery of the magnetic field cores and alternating polarity magnetic pole portions; 3, a magnetic field coil which extends into the recessed portion of the magnetic cores; 31, lead wires connected to the magnetic field coil 3 along one side surface of the magnetic field core 2a-1; 4, slip rings mounted on the shaft 1 of the magnetic field core 2a for supplying electric current to the field coil 3; 41, connecting terminals having ends extending radially of the magnetic field core 2a; 5a and 5b, fans mounted on the respective cores 2a and 2b which are fabricated by stamping a disk to form a center opening and blades at the periphery thereof and then folding the blades; and 51, recessed portions formed integrally with the fan 5a such as by a pressing process and which hold respective ones of the lead wires 31 in cooperation with the side surface of the magnetic field core 2a.

As shown in FIG. 3, recessed portions 51 are provided at two positions on the fan 5a corresponding to the positions of the lead wires 31. The recessed portions 51 are defined by two boundary lines a and b as shown in FIG. 3. The depth of the recessed portions 51 is slightly smaller than the diameter of the lead wire 31 so as to slightly depress the lead wire 31 upon completion of the fabrication thereof.

According to the embodiment thus constructed, the lead wires 31 of the magnetic field coil 3 are connected to the respective terminals 41 of the slip rings 4, and then the fan 5a is put on the magnetic field core 2a so that the inner surface 51-1 of the recessed portions 51 depress the lead wires 31 in cooperation with the side surfaces 2a-1 of the magnetic field core 2a. Finally, the fan 5a is fixed to the magnetic field core 2a at several points on the periphery of the magnetic field core 2a by a suitable method such as welding.

According to this embodiment, the connection between the lead wires 31 and the connecting terminals 41 of the slip rings 4 is performed before the fixing of the fan 5a to the magnetic field core 2a so that a relatively large space is provided at the area adjacent the connecting terminals 41, thereby making possible automatic connection of the lead wires by an automatic machine. Further, since the lead wires 31 are held firmly by the inner surfaces 51-1 of the recessed portions 51 on the fan 5a and the magnetic field core 2a, damage to the insulating layer of the lead wires and severing of the lead wires is prevented, even if there is some slack present in the lead wires.

We claim:

1. A rotor for rotary machines, comprising:
   a rotary shaft;
   magnetic field cores fixed to said rotary shaft and having an annular recessed portion;

a magnetic field coil received within said recessed portion;

slit rings mounted on said rotary shaft at one side of said magnetic field cores for supplying electric current to said field coil;

lead wires introduced at outsides of said magnetic field cores from said magnetic field coil and connected via terminals to said slip rings; and a fan fixed at one side of said magnetic field cores and having holding portions for firmly holding said lead wires;

wherein said holding portions are formed by recessed portions formed on said fan.

2. The rotor for rotary machines according to claim 1, wherein said holding portions are arranged at two portions angularly opposite each other on said fan.

* * * * *